(12) United States Patent
Villar Mesa et al.

(10) Patent No.: US 10,421,410 B2
(45) Date of Patent: Sep. 24, 2019

(54) RETENTION DEVICE FOR FITTING A MOBILE ELECTRONIC DEVICE IN A MOTOR VEHICLE

(71) Applicant: FORD GLOBAL TECHNOLOGIES, LLC, Dearborn, MI (US)

(72) Inventors: Pablo Villar Mesa, Nuess (DE); Thomas Rochulus, Cologne (DE); Robin Advena, Cologne (DE); Fabian Maetz, Much (DE); Tim Klausmann, Heinsberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/869,983

(22) Filed: Jan. 12, 2018

(65) Prior Publication Data
US 2018/0208128 A1    Jul. 26, 2018

(30) Foreign Application Priority Data
Jan. 20, 2017 (DE) .......................... 10 2017 200 943

(51) Int. Cl.
*B60R 11/00* (2006.01)
*B60R 11/02* (2006.01)
*B60R 7/04* (2006.01)

(52) U.S. Cl.
CPC ................ *B60R 11/02* (2013.01); *B60R 7/04* (2013.01); *B60R 2011/0007* (2013.01)

(58) Field of Classification Search
CPC .... B60R 5/00; B60R 5/03; B60R 7/00; B60R 7/02; B60R 7/04; B60R 7/06; B60R 7/08;
(Continued)

(56) References Cited

U.S. PATENT DOCUMENTS 3,804,233 A * 4/1974 Gregg, Jr. .............. B60N 3/103
                                                                           206/387.15
4,163,497 A * 8/1979 McEwen .................. B42F 17/12
                                                                              211/11

(Continued)

FOREIGN PATENT DOCUMENTS

CN         203255083 U     10/2013
WO     2016012693 A1     1/2016

OTHER PUBLICATIONS

English Machine Translation of CN203255083U.
English Machine Translation of WO2016012693A1.

*Primary Examiner* — Brian D Nash
(74) *Attorney, Agent, or Firm* — Vichit Chea; King & Schickli, PLLC

(57) ABSTRACT

A retention device is provided for fitting a mobile electronic device in a motor vehicle. The retention device has a storage compartment for the insertion of the mobile electronic device. The storage compartment is formed at least by a rear wall and an opposing front wall. At least at the inner side of the front wall facing the rear wall there is formed a retention face on which a large number of protruding retention elements are provided. Furthermore, the spacing between the rear wall and the front wall is less than the width B and/or the length L of the mobile electronic device and the front wall of the storage compartment extends in an inclined manner, wherein the upper edge of the front wall is orientated in the direction toward the rear side of the motor vehicle.

13 Claims, 8 Drawing Sheets

(58) Field of Classification Search
CPC ..... B60R 7/088; B60R 11/02; B60R 11/0241; B60R 2011/0005; B60R 2011/0007; A45C 2011/002; F16M 13/005; F16M 11/041
USPC .......................................... 224/275, 539, 544
See application file for complete search history.

(56) References Cited

U.S. PATENT DOCUMENTS

| | | | | |
|---|---|---|---|---|
| D260,455 S | * | 9/1981 | Haswell | D6/630 |
| 4,467,727 A | | 8/1984 | Strommer | |
| 4,744,463 A | * | 5/1988 | Merzon | G11B 23/0236 206/387.14 |
| D336,182 S | * | 6/1993 | Machut | D6/310 |
| D362,837 S | * | 10/1995 | Mankey | D12/419 |
| 6,059,115 A | * | 5/2000 | Ovadia | A45C 11/16 206/562 |
| 6,164,213 A | * | 12/2000 | Topps | A47B 21/0314 108/25 |
| 6,206,260 B1 | * | 3/2001 | Covell | B60N 3/083 206/5 |
| 6,483,698 B1 | * | 11/2002 | Loh | G06F 1/1632 320/113 |
| 6,752,304 B1 | * | 6/2004 | Hotary | B60K 37/00 224/544 |
| D514,576 S | * | 2/2006 | Sung | D14/434 |
| 6,994,575 B1 | * | 2/2006 | Clark | B60R 11/0241 439/173 |
| 7,469,951 B2 | | 12/2008 | Welschholz et al. | |
| D598,920 S | * | 8/2009 | Fujino | D14/447 |
| 7,969,732 B1 | * | 6/2011 | Noble | F16M 11/041 248/917 |
| 8,186,508 B2 | | 5/2012 | Fan | |
| D661,309 S | * | 6/2012 | Murrer | D14/447 |
| 8,256,814 B2 | * | 9/2012 | Thorsell | B60R 7/04 296/24.34 |
| 8,490,846 B1 | * | 7/2013 | Wheatley | B60R 11/02 224/277 |
| 8,670,230 B2 | * | 3/2014 | Cheng | G06F 1/1632 361/679.41 |
| 8,783,752 B2 | | 7/2014 | Lambert et al. | |
| 8,807,621 B2 | * | 8/2014 | Stephan | B60R 7/06 296/37.12 |
| 8,851,349 B2 | | 10/2014 | Wheatley et al. | |
| 9,211,001 B2 | * | 12/2015 | Negretti | A47B 23/04 |
| D748,616 S | * | 2/2016 | Noble | D14/253 |
| 9,338,903 B1 | * | 5/2016 | Loscalzo | A47B 23/042 |
| 9,501,096 B2 | * | 11/2016 | Sharma | G06F 1/1632 |
| 9,605,790 B1 | * | 3/2017 | Alonzo | G06F 1/1626 |
| 2008/0174136 A1 | * | 7/2008 | Welschholz | B60R 7/06 296/37.12 |
| 2009/0004420 A1 | | 1/2009 | Wheatley | |
| 2010/0314521 A1 | * | 12/2010 | Pauken | B60R 11/02 248/316.1 |
| 2013/0043779 A1 | | 2/2013 | Fan | |
| 2013/0048801 A1 | * | 2/2013 | Weinberg | F16M 11/041 248/121 |
| 2017/0144613 A1 | * | 5/2017 | Catlin | B60R 11/0241 |
| 2018/0029537 A1 | * | 2/2018 | Lupsan | B60N 3/101 |
| 2018/0201197 A1 | * | 7/2018 | Gaw, Jr. | B60R 11/02 |
| 2018/0356030 A1 | * | 12/2018 | Channon | F16M 13/022 |
| 2019/0023179 A1 | * | 1/2019 | Porcs | B60Q 3/20 |

\* cited by examiner

RETENTION DEVICE FOR FITTING A MOBILE ELECTRONIC DEVICE IN A MOTOR VEHICLE

TECHNICAL FIELD

This document relates to a retention device for fitting a mobile electronic device in a motor vehicle, wherein the retention device has a storage compartment for the insertion of the mobile electronic device.

BACKGROUND

In motor vehicles there are typically provided for storing mobile devices, such as mobile telephones, compartments, shelves, or receiving members in which the devices can be placed. In such receiving devices, however, the devices are stored in an unstable manner and they cannot be positioned in a specific position since no means for orientation are provided. The devices thus in particular cannot be fixed at a specific angle which enables a driver or a passenger, for example, to use and to be able to easily read navigation software on the mobile device. There is therefore a requirement for a system with which mobile electronic devices of a different type and size can be fitted in a vehicle in a desired orientation.

In order to retain mobile devices, spectacles or other objects on a surface of a vehicle instrument panel there are known, for example, silicone mats which are placed on the respective surface. As a result of the good adhesion properties of such mats, objects which are placed thereon do not slide away so easily. Such a mat is known, for example, from US 2009/0004420 A1. Using such mats, however, a stable orientation of a mobile telephone in a desired orientation which also enables a good view of the display of the device is not possible.

Furthermore, for mobile devices such as laptops or tablets there are known retention devices which are fitted to a respective device in order, for example, to be able to place it at a specific angle on a surface. Such retention devices have also already been proposed for mobile telephones. However, these retention devices constitute separate components which would have to be carried and temporarily fitted to the respective electronic device in order to be able to use them inside a motor vehicle. Furthermore, such a retention device would have to be removed again when the user leaves the vehicle and also removes his device from the vehicle. This is consequently not a convenient solution to the problem, but instead retention devices which are fixedly installed inside a motor vehicle are preferred.

U.S. Pat. No. 7,469,951 B2 proposes, for example, a fixedly installed retention member on the instrument panel of a motor vehicle in which a mobile telephone can be inserted in an upright manner. The retention member is pivotably supported about different axes so that the mobile telephone can be positioned in different angular positions. The retention member in this instance enables both tilting within a lower hinge and rotation about an axis which extends transversely relative to this pivot axis of the hinge. It is thus also possible to rotate the mobile telephone in the direction of the driver or passenger. However, complex pivot mechanisms whose production is complex are required for this. Furthermore, there is the risk of damage to the pivot mechanisms by repeated or incorrect handling.

U.S. Pat. No. 8,783,752 B2 discloses a storage compartment in a motor vehicle which can be closed with a displaceable cover. A mobile device such as a mobile telephone can be placed in the cover. In this instance, the cover is located in a slightly oblique manner and has a recess in which the mobile device can be placed. This recess is provided with an anti-slip surface which comprises, for example, rubber or silicone. A selective and stable orientation of a mobile device in a specific direction is, however, also difficult with this device.

U.S. Pat. No. 8,851,349 B2 proposes in contrast a retention member for a mobile device which comprises a mat with two upwardly protruding side walls. The mat may, for example, be placed with an adhesive layer on the instrument panel or the central console of a motor vehicle. A recess is provided in the center of each side wall so that a mobile device can be inserted from above into the slot which is formed in this manner. In this instance, the dimensions are selected in such a manner that the mobile device can be inserted into the slot in a transverse position. The rear inner face of the recesses is provided with grooves in this instance. These can be used to insert the mobile device into the recesses at different angles. However, the device can also simply be placed in the intermediate space between the two side walls. To this end, the retention member is constructed in a corrugated manner in this region and also has an adhesive surface. A positioning of the mobile device in which it is rotated through an angle about the longitudinal axis of the motor vehicle is, however, not possible with this mat.

CN 203255083 U discloses a storage compartment for a motor vehicle which can be closed from above with a cover. If the cover is pivoted upward, a mobile telephone can be inserted in an upright state into a recess in a front wall of the compartment. On the lid there are two support elements on which the upper side of the mobile telephone can be leaned. As a result of the arrangement of the different support elements, the mobile telephone can be retained at two different angles with an appropriate selection. In order to also be able to hold a mobile telephone transversely, the support elements are constructed in a movable manner. In this manner, the support elements can be moved closer to the upper edge of the now transverse mobile telephone so that the mobile telephone can also be leaned on the front support element in this position. As a result of the specific configuration of the cover with the pivotable support elements, the mobile telephone in this position can, however, only be retained in one predetermined position. In particular, there is no provision for a rotation in the direction of the driver or passenger.

In view of the prior art set out, the field of retention devices for mobile devices in motor vehicles still leaves room for improvement.

SUMMARY

An object is to provide a retention device for mobile devices which enables simple but secure positioning of the mobile device in different orientations. The object is achieved with a retention device having the features set forth in the following description and claims.

It should be noted that the features and measures set out individually in the following description can be combined with each other in any technically advantageous manner and set out in other embodiments of the retention device. The description additionally characterizes and specifies the retention device in particular in connection with the Figures.

The retention device for fitting a mobile electronic device in a motor vehicle has a storage compartment for the insertion of the mobile electronic device which will also be referred to below for short as a mobile device. The mobile device may, for example, be a mobile telephone, a mobile navigation device or other electronic telecommunications device. The storage compartment may in particular be provided below the instrument panel in the central console. A device which is inserted in this storage compartment is readily accessible and visible for the driver and passenger.

The storage compartment is formed at least by a rear wall and an opposing front wall. In this instance, the terms "front wall" and "rear wall" refer to two opposing walls of the storage compartment, wherein the front wall when viewed by the passengers of the motor vehicle is located further forward, whilst the rear wall is located therebehind. At least at the inner side of the front wall facing the rear wall, a retention face is formed with means for supporting the mobile electronic device so as to be protected from sliding. These retention means may comprise a large number of protruding retention elements.

Furthermore, the spacing between the rear wall and the front wall is less than the width B and/or the length L of the mobile electronic device. The spacing is in this instance the shortest connection line between the rear wall and the front wall. Furthermore, the front wall of the storage compartment extends in an inclined manner, wherein the upper edge of the front wall faces the rear side of the motor vehicle. The front wall is consequently not vertical, but instead in the direction toward the rear side there is an angle $\alpha$ which is less than 90° between the front wall and the horizontal.

A mobile device can thus be inserted in the storage compartment by being placed with the lower side thereof on the retention face of the inclined front wall. As a result of the dimensions of the storage compartment, the upper side of the device can be leaned against the rear wall of the storage compartment without it falling downward. In this instance, the device can be placed at different angles with respect to the horizontal so that the user can freely select an angle which is convenient for him. To this end, there are provided no fixedly predetermined receiving members in which the device is inserted, but instead the device is supported only on the front wall and the rear wall. To this end, the front wall is provided with protruding retention elements which prevent the device from sliding off the front wall.

The mobile device can be inserted in a simple manner into the storage compartment, wherein it is readily visible and readily accessible. To this end, no complex pivot mechanisms or specially formed receiving members are required. The compartment can also be used to deposit other objects.

In this instance, the spacing between the rear wall and the front wall is at least smaller than the length of the mobile device. The device can thus be supported in an upright state on the front wall and leaned against the rear wall. However, the spacing is preferably even smaller than the width of the mobile device so that the device can also be supported transversely on the front wall.

Typical dimensions of mobile electronic devices which are operated in motor vehicles have a width between 5 cm and 15 cm. The length is between 10 cm and 25 cm. This includes both mobile telephones and mobile navigation devices or tablets. The dimensions of the storage compartment are preferably configured for mobile telephones. In particular the dimensions are configured for transversely inserted mobile telephones since the display thereof when operating a piece of navigation software is often retained in a transverse manner. The spacing between the rear wall and the front wall is then, for example, less than 5 cm.

As a result of the inclination of the front wall, it is possible in this case to place the device at different angles in a simpler manner without it sliding off from the front wall. Furthermore, depending on the formation of the storage compartment, it can also be placed more simply so as to be rotated about the longitudinal axis of the motor vehicle in order, for example, to rotate the display in the direction of the driver or passenger. In this instance, the device may at the same time also be supported on side walls of the storage compartment.

In this instance, the opening cross-section of the storage compartment may be rectangular. In an advantageous embodiment, however, the storage compartment does not have a rectangular opening cross-section but instead becomes narrower toward the side walls. In this manner, the positioning of the electronic device in different positions can also be facilitated. This may, for example, be achieved by the front wall and/or the rear wall not being constructed in a straight manner, They may be constructed in a bent manner so that the spacing between the two walls is greater at the center than in the region of the side walls of the storage compartment. In particular the front wall may be configured in such a manner. In this instance, a wall may have a uniform bend or a plurality of angled portions. With a front wall which is formed in such a manner, the lower edge of a device can be placed in an even more stable manner in different orientations.

Furthermore, at the inner side of the rear wall facing the front wall, a retention face with means for supporting the mobile device so as to be prevented from sliding may also be formed. This additional retention face is not absolutely necessary since a device can also be leaned in a simple manner against the rear wall. Depending on the dimensions of the respective device and the storage compartment, however, such an additional retention face may be advantageous. In particular the retention of the device in a position which is rotated about the longitudinal axis of the motor vehicle is facilitated by such a retention face. In this instance, this retention face may in particular be produced by a planar adhesive surface or a face with a plurality of protruding retention elements.

Other walls of the storage compartment may also be used to support the mobile electronic device. For example, the storage compartment may have two side walls which connect the rear wall to the front wall. An additional retention face having means for supporting the mobile device so as to be prevented from sliding can be formed at least at the inner side of one of these side walls.

A retention face may be constructed in different manners, wherein different means for retaining the mobile device so as to be prevented from sliding may also be combined with each other. As already set out, a retention face may, for example, be formed on the rear wall of the storage compartment with a planar adhesive face. To this end, as a result of their good adhesive properties, rubber or silicone faces have been found to be advantageous. However, a retention face may also have a large number of protruding retention elements. At least one retention element may in this instance be formed by a transversely extending rib. A plurality of ribs which are located one above the other can be used to support the mobile device at different positions. The device may in this instance be positioned on one or more ribs. The device is positioned on a plurality of ribs when it is placed in a state rotated about the longitudinal axis of the motor vehicle.

Alternatively or additionally, at least one retention element may also be formed by means of a burl or a pointed gudgeon. Such an embodiment has the advantage that the mobile device can be placed in an even simpler manner in a state rotated about the longitudinal axis of the motor vehicle. In each orientation, the user finds retention elements on which he can support the device.

The retention elements may also each have an adhesive surface, for example, of rubber or silicone. It has been found to be advantageous for the retention elements to be constructed in a flexible manner so that they can be readily pressed in whilst a device is placed by the user.

In an advantageous embodiment of the invention, at least the retention face is constructed on the front wall on a flexible retention mat which is introduced into the storage compartment. This retention mat may completely or partially comprise a flexible material such as rubber and/or silicone. The protruding retention elements may be formed in one piece from the material of the mat.

The mat may be securely fitted to the storage compartment, which can be achieved, for example, by means of adhesive bonding. However, the mat may also be a separate component which in particular for cleaning purposes can be removed from the storage compartment. The mat is in this instance not only in abutment with the front wall in order to provide a retention face at that location, but instead it may also cover other regions of the storage compartment. For example, the retention mat may cover a base face between the rear wall and the front wall of the storage compartment. Accumulations of dirt on the base of the compartment can thus be readily removed together with the mat. However, the retention mat may also extend completely or partially on side walls and/or the opposing rear wall.

BRIEF DESCRIPTION OF THE DRAWINGS

Various advantageous embodiments of the retention device are disclosed in the dependent claims and the following description of the Figures, in which:

DETAILED DESCRIPTION

Figure 1:
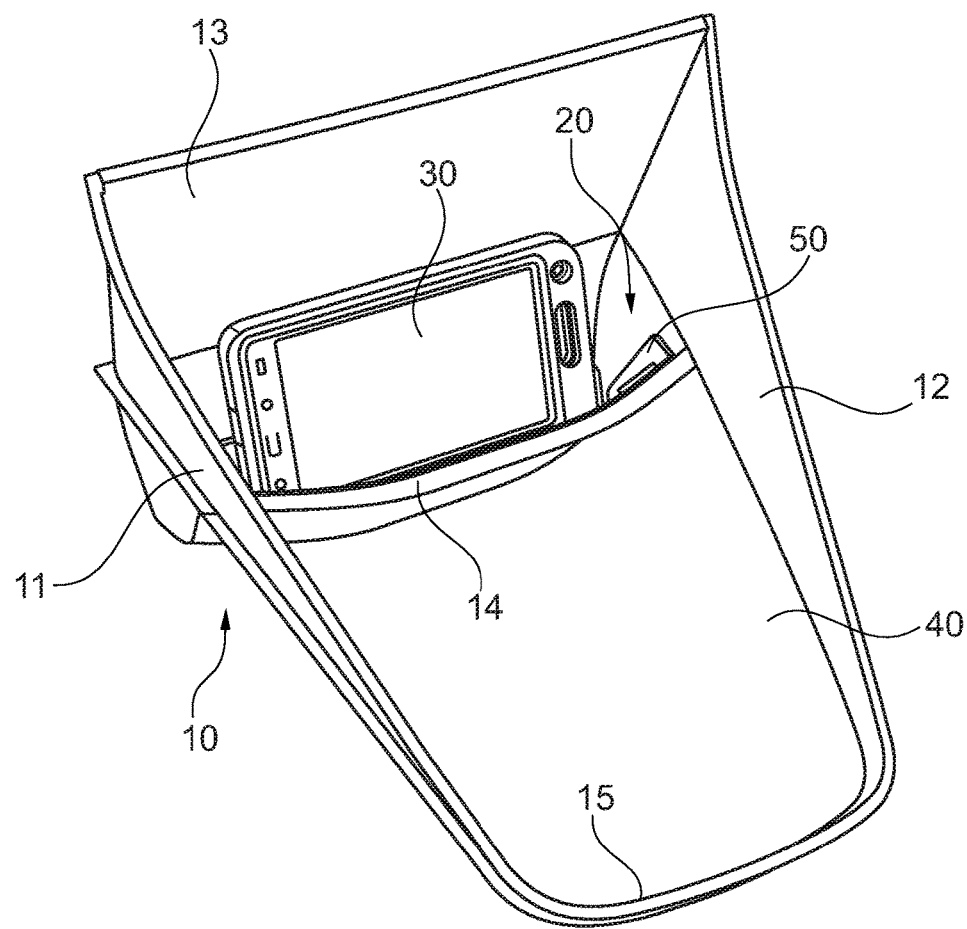
FIG. 1 is a perspective view of a first embodiment of the retention device with a mobile device introduced.

In the different Figures, identical components are always given the same reference numerals, for which reason they are generally also only described once.

FIG. 1 shows a first embodiment of a retention device 10 for fitting a mobile electronic device 30. Purely by way of example, the mobile electronic device 30 is referred to below as a mobile telephone 30. In this instance, the description of the Figures is given with reference to a mobile telephone 30 which using the retention device 10 inside a motor vehicle is intended not only to be stored so as to be prevented from sliding, but also moved into a specific position. However, the mobile telephone 30 may also be replaced by a mobile navigation device, a mini tablet or other electronic device which is carried by a passenger of the motor vehicle and stored temporarily in the retention device 10.

The retention device 10 has in this instance a storage compartment 20 in which the mobile telephone can be introduced. To this end, the storage compartment 20 has at least a rear wall 13, a front wall 14 and two side walls 11 and 12 which connect the front wall 14 and the rear wall 13 to each other to form a housing which is constructed so as to be open at least in an upward direction. Furthermore, there is preferably provided a base face which is, however, not absolutely necessary. The storage compartment 20 may, for example, also be constructed as an annular housing without a base. For example, it may be a type of insert which is integrated in another storage compartment so that the storage compartment 20 of the retention device according to the invention requires no base face under some circumstances.

The illustration of the storage compartment 20 of the Figures is consequently intended to be understood to be purely exemplary. The storage compartment may be configured in any other manner, in particular with a different number of boundary walls and the shape of the walls may also be selected to be different.

The opening cross-section of the storage compartment 20 may be rectangular. In the embodiment of the Figures, however, the storage compartment becomes narrower in the direction toward the side walls 11, 12. To this end, the front wall 14 has two angled portions so that the spacing between the rear wall 13 and the front wall 14 in the region of the side walls 11 and 12 is less than at the center of the two walls.

The retention device 10 may, for example, be integrated below an instrument panel in the central console of the motor vehicle. The storage compartment 20 does not in this instance have to be a separate component but instead it can also be formed integrally with other elements of the central console. In this case, the retention device 10 is orientated in such a manner that the driver seat in FIG. 1 is located on the left beside the retention device 10. From the viewpoint of a driver, the rear wall 13 is consequently located at the rear, whilst the front wall 14 is at the front. The front wall 14 is constructed in this instance in an oblique manner, as can be seen, for example, in the illustration of FIG. 4. The storage compartment 20 consequently expands in an upward direction.

In the embodiment of FIG. 1, the side walls 11, 12 are constructed in a triangular or trapezoidal manner and taper acutely downward in the direction toward the rear side of the motor vehicle. The side walls 11, 12 protrude further beyond the front wall 14 and the ends thereof are connected to each other by means of an additional boundary wall 15. This boundary wall 15 has only a small height, wherein, between the two side walls 11, 12 in the region between the front wall 14 and the boundary wall 15, a storage face 40 with a flat border is formed. Objects can be placed on this storage face 40. Inside the storage compartment 20, a power connection and/or a data connection may also be provided (not illustrated) in order to be able to connect the mobile telephone 30 with a cable to such a connection. A wireless transmission of data or a wireless energy transmission is naturally also possible by means of induction.

The dimensions of the storage compartment 20 are preferably selected in such a manner that a mobile telephone 30 with typical dimensions can readily be introduced transversely into the storage compartment 20. To this end, the storage compartment 20 has, for example, a width of from 10 to 20 cm. The depth of the storage compartment 20 is selected in such a manner that it is smaller than the typical width of a mobile telephone. For example, the depth of the storage compartment 20 is in the order of magnitude of approximately 5 cm. These size relationships result in the mobile telephone 30 being in abutment with the rear wall 13 when a user places the lower edge thereof on the oblique front wall 14. So that the mobile telephone 30 is retained on the front wall 14 in this case, a retention face 50 is provided. This retention face 50 has means, that is to say, retention elements for supporting the mobile telephone 30 so as to be prevented from sliding, which can be constructed in different manners. Possible retention elements 51, 51' on this retention face 50, 50' are explained by way of example with reference to FIGS. 4 to 8.

Figure 2:
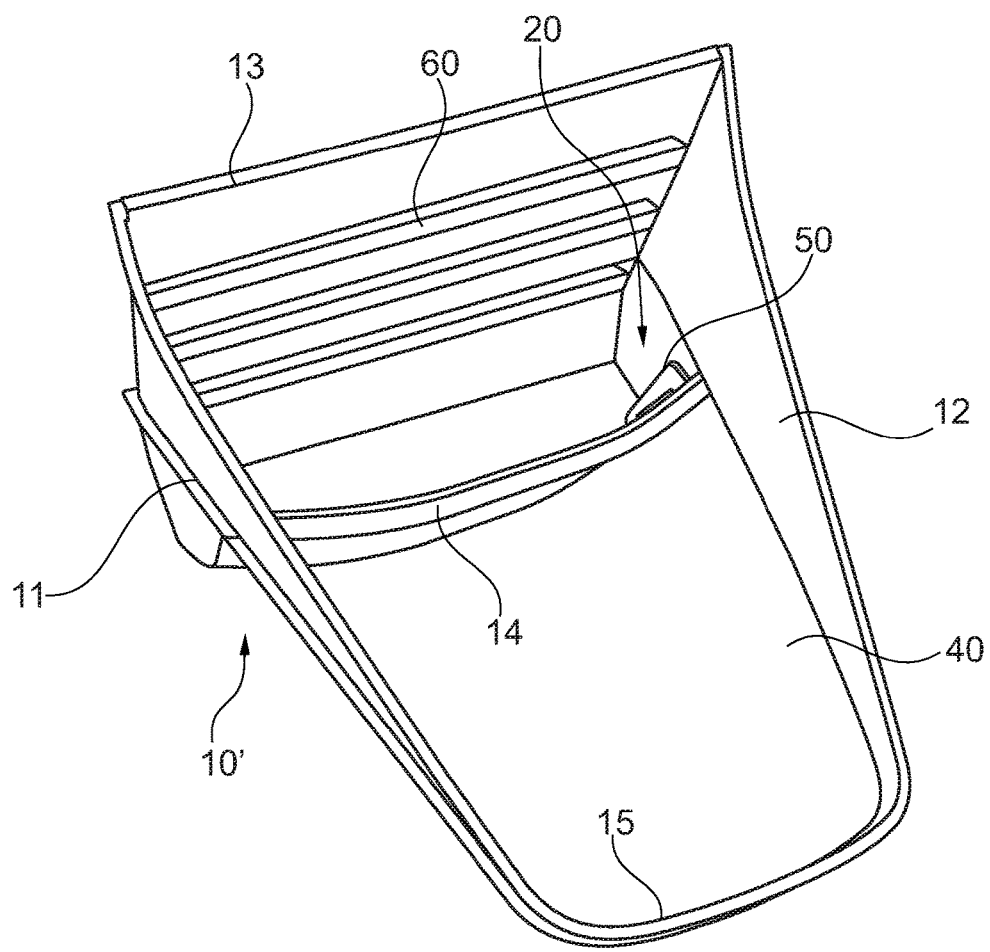
FIG. 2 is a perspective view of a second embodiment of the retention device in an illustration without a mobile device.

In this instance, it is sufficient for the spacing between the front wall 14 and the rear wall 13 to be selected in such a manner that the mobile telephone 30 can be leaned against the rear wall. In this instance, the mobile telephone is preferably at an angle between 45° and 90° with respect to the horizontal, wherein the display of the device can be read easily from the eye level of the driver and/or passenger. To this end, the rear wall 13 may be constructed in a planar manner, as is the case in the embodiment of FIG. 1. However, the rear wall 13 of the storage compartment 20 may also be constructed as a retention face in order to retain the mobile telephone 30 in an oblique position. Such a retention face may be provided with retention elements 60, as can be seen in the perspective view of a second embodiment of a retention device 10' according to FIG. 2. A plurality of transversely extending ribs are provided as retention elements 60. These ribs are preferably constructed from a flexible material such as rubber or silicone. Alternatively or additionally, differently shaped retention elements may also be used. For example, they may be burls or pointed gudgeons.

Figure 3:
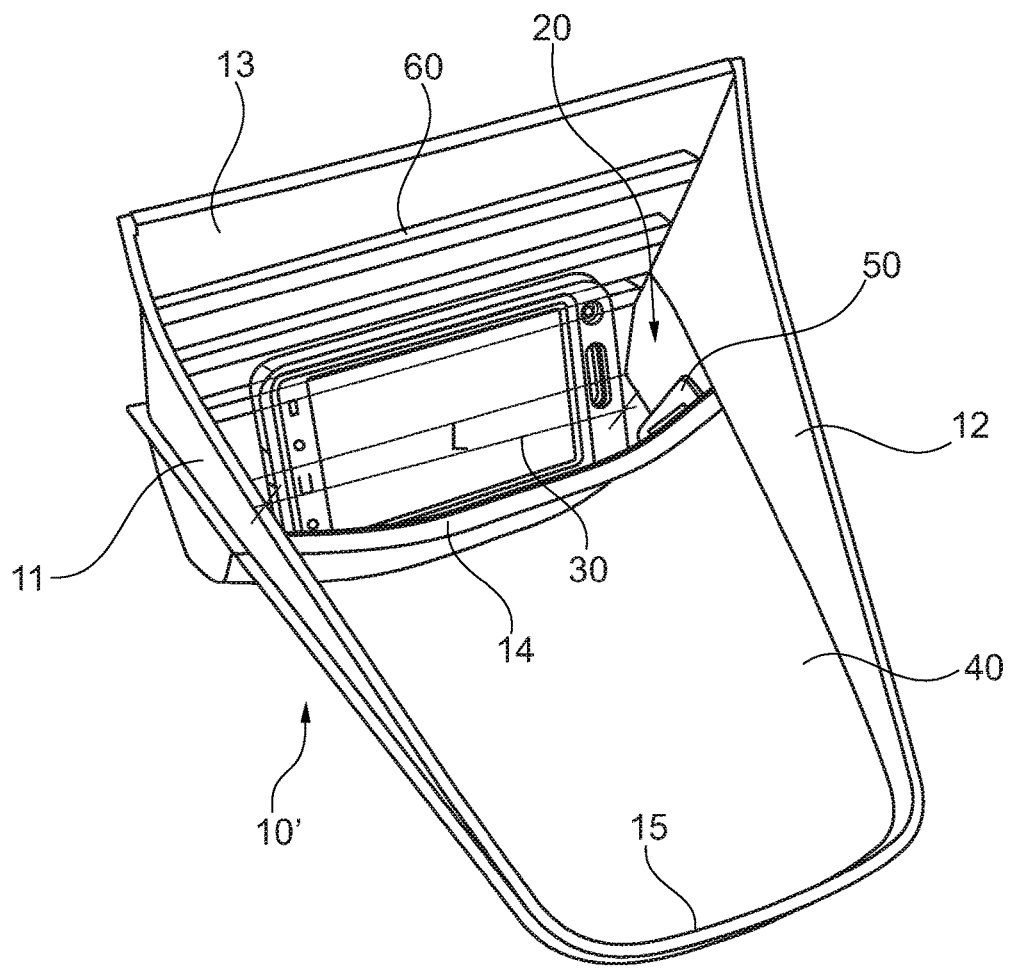
FIG. 3 shows the retention device according to FIG. 2 with the mobile device introduced.
Figure 4:
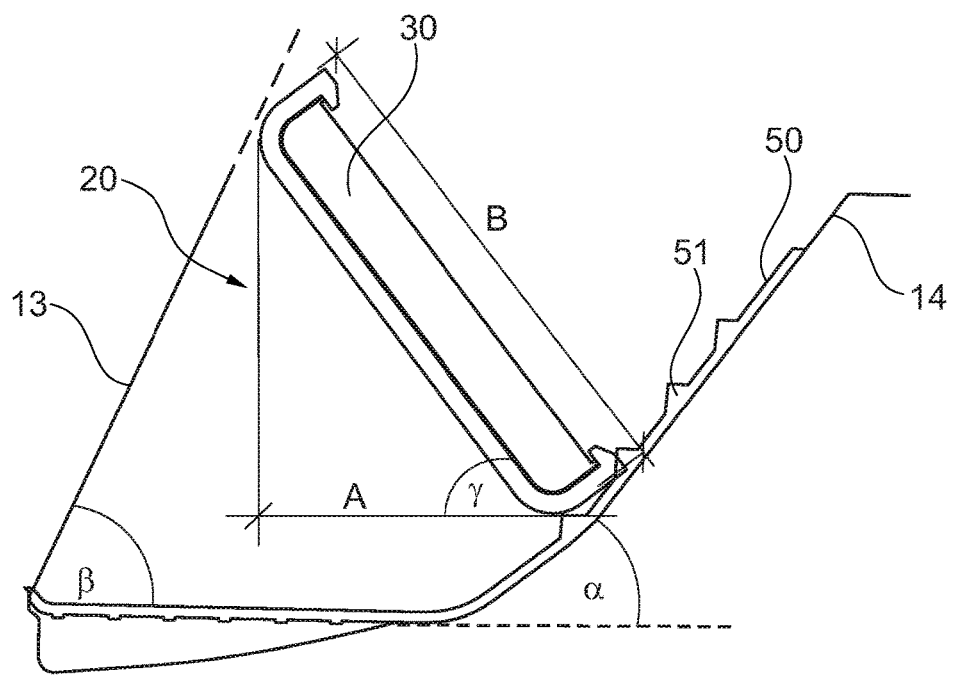
FIG. 4 is a schematic longitudinal section through a retention device according to FIG. 1.

FIG. 3 shows the embodiment of the retention device 10' with a mobile telephone 30 introduced. The device is inserted transversely in the storage compartment 20, but it could also be inserted in an upright state. FIG. 4 is a schematic longitudinal section through a retention device according to FIG. 1 without retention elements on the rear wall 13. From this viewpoint, in particular the construction of the retention face 50 with a plurality of retention elements 51 on the front wall 14 can be seen. The retention elements 51 are also a plurality of transversely extending ribs on which the mobile telephone 30 can be supported. At the same time, it leans on the rear wall 13. These retention elements 51 are also preferably formed in a flexible manner from rubber or silicone.

In this instance, the front wall 14 of the storage compartment 20 extends in an oblique manner at an angle α with respect to the horizontal, wherein the upper edge of the front wall 14 is orientated in the direction toward the rear side of the motor vehicle. The rear side of the motor vehicle is consequently on the right in the drawing plane of FIG. 4. The angle α is less than 90°, in particular it may be between 30° and 60°. In the embodiment of FIG. 4, it is approximately 45°.

The rear wall 13 in this embodiment also does not extend perpendicularly, but instead at an angle β with respect to the horizontal which is, however slightly greater than the angle α. The angle β may in particular be between 60° and 80°. In this instance, the upper edge of the rear wall 13 may be inclined in the direction toward the rear side or the front side of the motor vehicle. In the embodiment of FIG. 4, the upper edge of the rear wall 13 is inclined in the direction toward the rear side of the motor vehicle. The rear wall 13 and the front wall 14 consequently extend in the same direction in an inclined manner, but at different angles with respect to the horizontal so that the storage compartment 20 expands slightly in an upward direction.

The spacing between the rear wall 13 and the front wall 14 is selected in such a manner that an electronic device 30 can be placed in different orientations with the lower side thereof on the retention face 50 and leaned against the rear wall 13. In this instance, the angle between the mobile telephone 30 and the horizontal is in a range which brings about good readability of the display of the mobile telephone 30. The user can freely select the angle and adapt it to his requirements since the mobile telephone 30 can be placed on different ribs 51. The number of ribs 51 and the spacing between them are selected accordingly.

In this instance, the spacing between the front wall 14 and the rear wall 13 and the inclination of the two walls is selected in such a manner that the mobile telephone can also be placed transversely on the front wall 14 as shown in FIGS. 1 and 3. The spacing between the two walls is then in the lower region less than the width B of the mobile telephone 30 so that it can be leaned with the upper edge thereof on the rear wall 13 if the device 30 is placed in a relatively low position on the oblique front wall 14. If the mobile telephone 30 were placed upright at the same position, the angle could become too steep. In this storage variant, the user could therefore place the device in a higher position on the front wall 14.

If a compact mobile telephone having the width B=5 cm is assumed, at a spacing A=3.5 cm between the front wall and rear wall an angle γ=45° would be achieved. Since a flatter angle can be achieved by the device being placed in a higher position (the compartment opens upward and the spacing is larger), the spacing on the base of the compartment defines the steepest angle of the corresponding device. It would be possible, for example, to assume an inclination of γ=60°, wherein 60° corresponds to a spacing A of 2.5 cm.

The retention face 50 may also be constructed without any retention elements if a surface material with a very good adhesion is selected for this purpose. This is, for example, the case with silicone or rubber. Furthermore, the retention face 50 with or without retention elements 51 can be securely connected to the inner side of the front wall 14. However, it may also be a separate component if the retention face is, for example, constructed on a mat which is inserted in the storage compartment 20.

Figure 5:
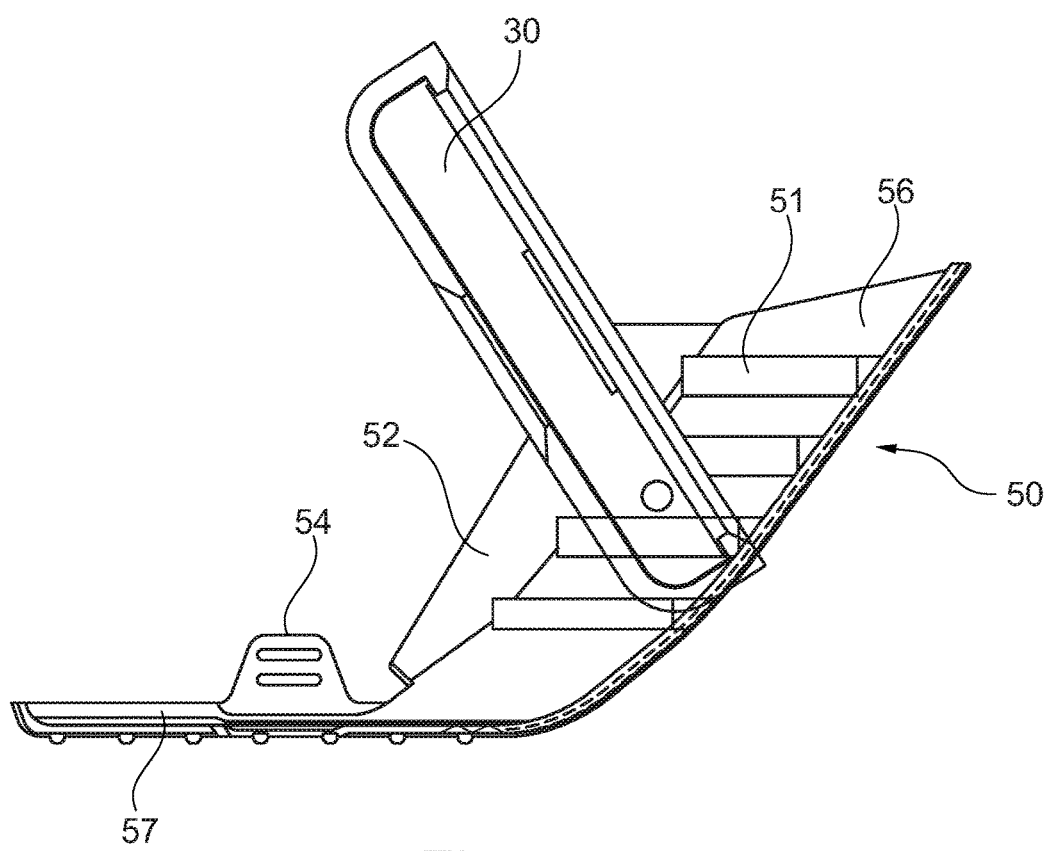
FIG. 5 is a perspective side view of a retention mat.
Figure 6:
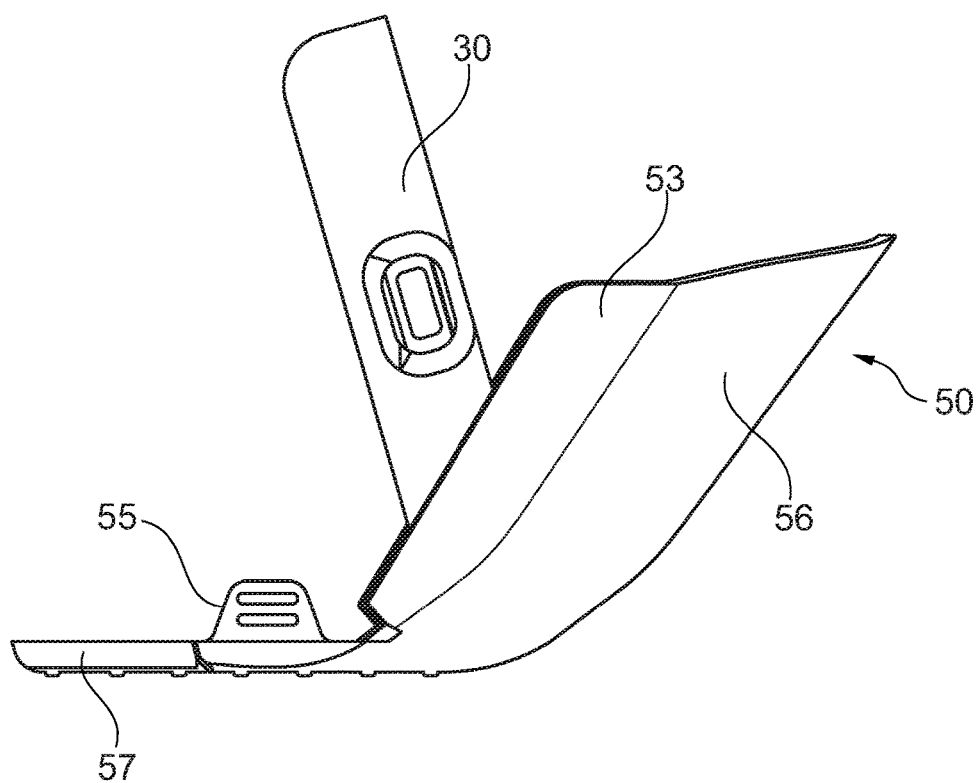
FIG. 6 is another perspective side view of the retention mat according to FIG. 5.
Figure 7:
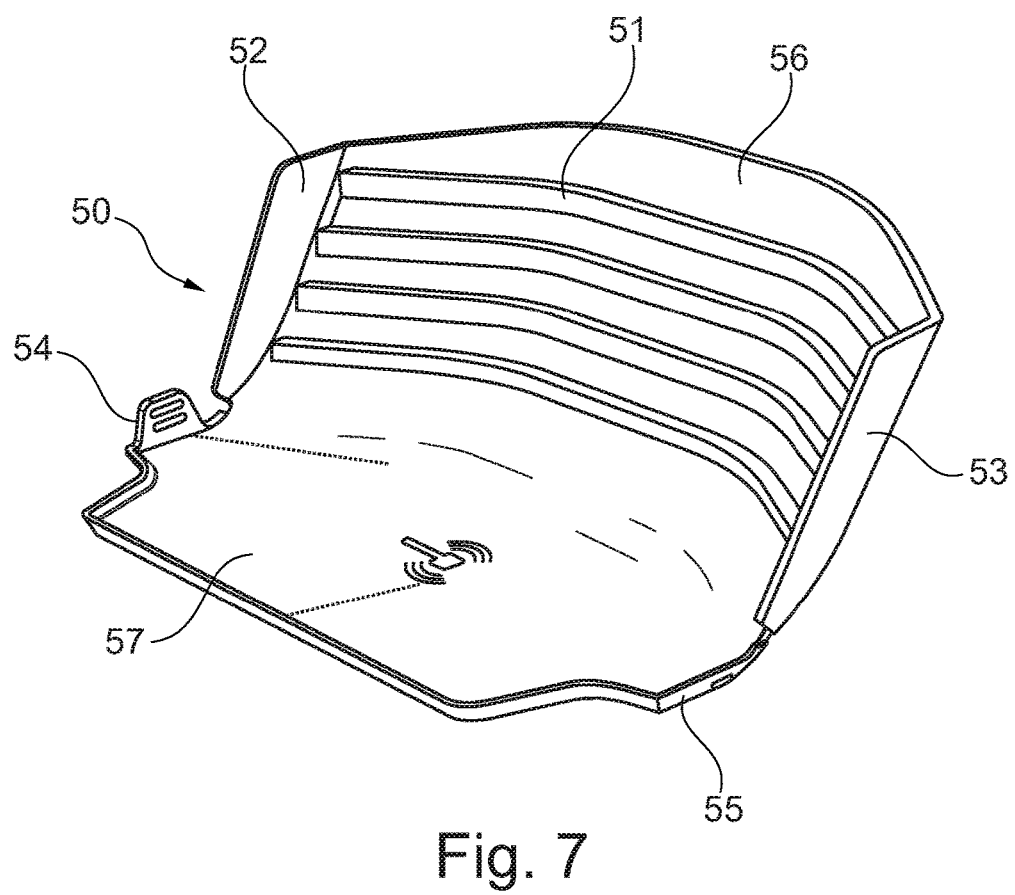
FIG. 7 is another perspective view of a first embodiment of a retention mat.

FIGS. 5, 6 and 7 show such a retention mat 50 as two different perspective views. The retention mat 50 is produced from rubber or silicone and is consequently flexible. The retention mat 50 has a rear face 56 from which the plurality of retention ribs 51 protrude. With this rear face 56, the mat may be in abutment with the front wall 14 of the storage compartment. Furthermore, there are formed laterally on the rear face 56 two side wings 52 and 53 which are in abutment with side walls of the storage compartment. The rear face 56 merges into a base face 57 which is positioned on the base face of the storage compartment. In order to be able to readily remove the retention mat 50 from the storage compartment, for example, for cleaning purposes, two lateral gripping tabs 54 and 55 are constructed on the base face 57.

Figure 8:
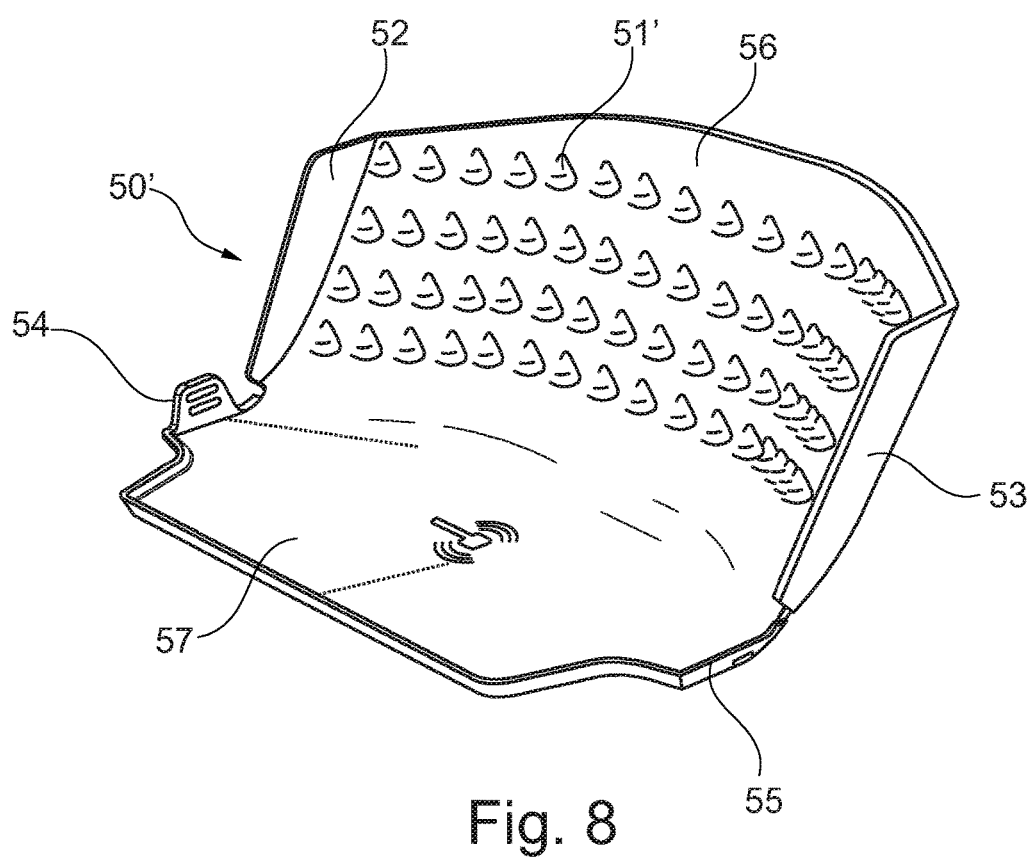
FIG. 8 is a perspective view of a second embodiment of a retention mat.

FIG. 8 is a perspective view of a second embodiment of a retention mat 50' in which retention elements 51' are formed by means of a large number of burls and/or pointed gudgeons 51. These retention elements 51' may be arranged beside each other in a plurality of uniform rows, as provided in the embodiment of FIG. 8. The rows of retention elements 51' may, however, also be fitted so as to be offset with respect to each other.

Both with ribs and with burls or gudgeons as retention elements, the mobile telephone can be placed in different orientations on the respective retention elements. In this instance, the device may also be placed so as to be rotated about the longitudinal axis of the motor vehicle on the retention elements. As a result of the arrangement and number of the retention elements at the rear side of the retention mat, there are a large number of positions in which the mobile telephone can be held. In particular when the retention elements are constructed in a resilient manner from rubber or silicone, the lower side of the mobile telephone has enough retention on the elements to be able to place it in a stable manner in a desired orientation.

What is claimed:

1. A retention device for fitting a mobile electronic device in a motor vehicle, comprising a storage compartment for insertion of the mobile electronic device, said storage compartment being formed at least by a rear wall, an opposing front wall and two side walls that connect the rear wall to the front wall, wherein at least at an inner side of the front wall facing the rear wall there is formed a retention face on which a plurality of protruding retention elements are provided, wherein the plurality of protruding retention elements are flexible, wherein the front wall of the storage compartment extends in an inclined manner, wherein an upper edge of the front wall is orientated in a direction toward a rear side of the motor vehicle, and wherein an additional retention face, having means for supporting the mobile electronic device so as to be prevented from sliding, is formed at least at a second inner side of one of the two side walls.

2. The retention device as claimed in claim 1, wherein at least one of said plurality of protruding retention elements is formed by a transversely extending rib.

3. The retention device as claimed in claim 1, wherein at least one of said plurality of protruding retention elements is formed by a burl.

4. The retention device as claimed in claim 1, wherein at least one of said plurality of protruding retention elements is formed by a pointed gudgeon.

5. The retention device as claimed in claim 1, wherein the retention face is constructed on a flexible retention mat which is positioned in the storage compartment.

6. The retention device as claimed in claim 5, wherein the retention mat further covers a base face between the rear wall and the front wall of the storage compartment.

7. The retention device as claimed in claim 6, wherein another retention face with a plurality of second protruding retention elements is formed on the rear wall.

8. The retention device as claimed in claim 1, wherein a second additional retention face with a plurality of additional protruding retention elements is formed on the rear wall.

9. A retention device for fitting a mobile electronic device in a motor vehicle, comprising a storage compartment for insertion of the mobile electronic device, said storage compartment being formed at least by a rear wall, an opposing front wall and two side walls that connect the rear wall to the front wall, wherein an additional retention face, having means for supporting the mobile electronic device so as to be prevented from sliding, is formed at least at a second inner side of one of the two side walls, wherein at least at an inner side of the front wall facing the rear wall there is formed a retention face on which a plurality of protruding retention elements are provided, wherein the front wall of the storage compartment extends in an inclined manner, wherein an upper edge of the front wall is orientated in a direction toward a rear side of the motor vehicle, and wherein at least one of said plurality of protruding retention elements is formed by a transversely extending rib.

10. The retention device as claimed in claim 9, wherein the retention face is constructed on a flexible retention mat which is positioned in the storage compartment.

11. The retention device as claimed in claim 10, wherein the retention mat further covers a base face between the rear wall and the front wall of the storage compartment.

12. The retention device as claimed in claim 11, wherein another retention face with a plurality of additional protruding retention elements is formed on the rear wall.

13. A retention device for fitting a mobile electronic device in a motor vehicle, comprising a storage compartment for insertion of the mobile electronic device, said storage compartment being formed at least by a rear wall and an opposing front wall, wherein at least at an inner side of the front wall facing the rear wall there is formed a first retention face on which a plurality of first protruding retention elements are provided, wherein the first retention face is constructed on a flexible retention mat which is positioned in the storage compartment, wherein the flexible retention mat further covers a base face between the rear wall and the front wall of the storage compartment, wherein the front wall of the storage compartment extends in an inclined manner, wherein an upper edge of the front wall is orientated in a direction toward a rear side of the motor vehicle, and wherein a second retention face with a plurality of second protruding retention elements is formed on the rear wall.

* * * * *